Sept. 29, 1964     J. H. POPE ETAL     3,150,926
FLUIDIZED PRODUCTION OF CALCIUM CARBONATE
Filed May 15, 1961
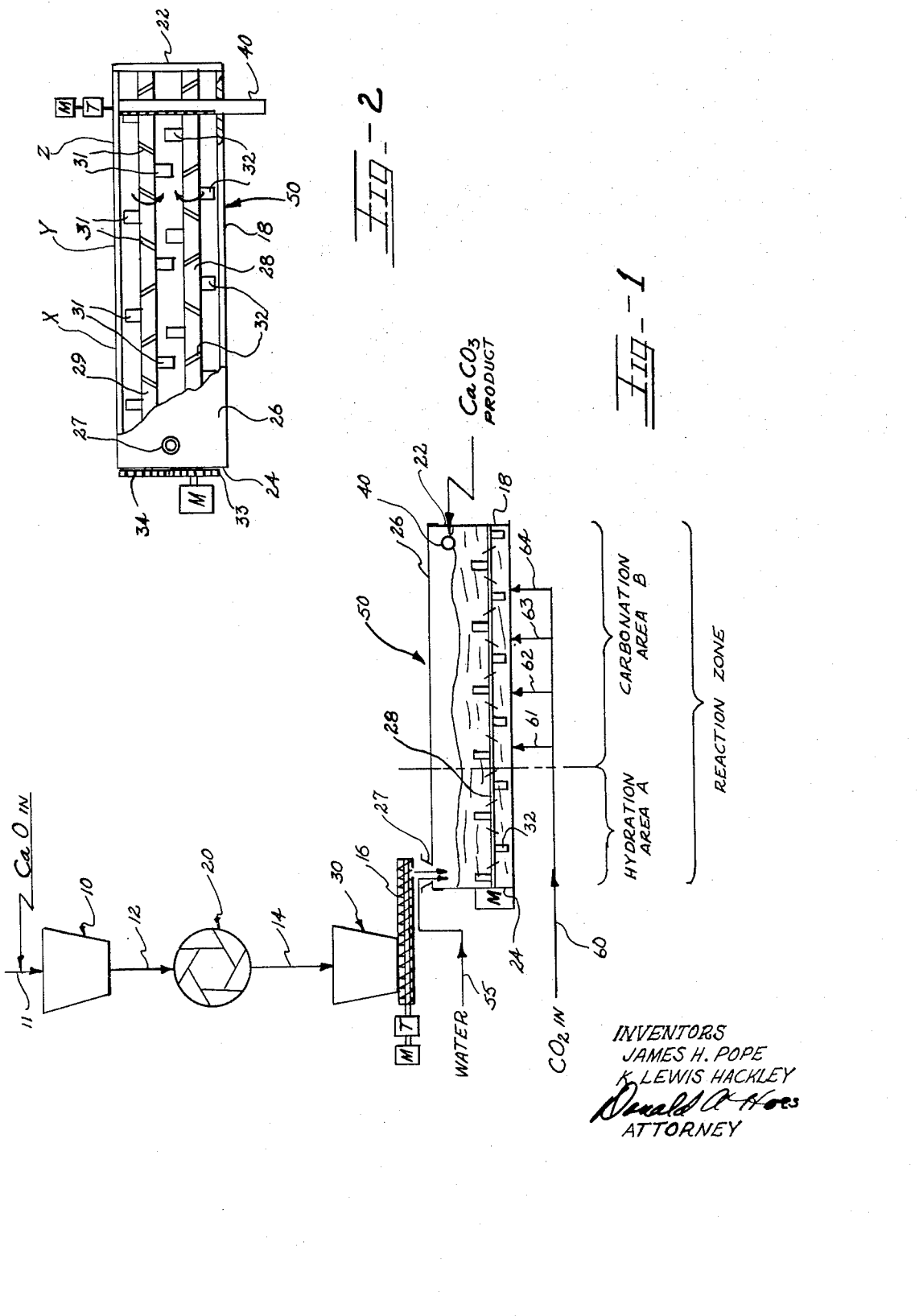
INVENTORS
JAMES H. POPE
K. LEWIS HACKLEY
ATTORNEY United States Patent Office 3,150,926
Patented Sept. 29, 1964

3,150,926
FLUIDIZED PRODUCTION OF CALCIUM CARBONATE
James H. Pope, Hamilton, and Kenneth Lewis Hackley, Oxford, Ohio, assignors to Champion Papers Inc., a corporation of Ohio
Filed May 15, 1961, Ser. No. 110,117
15 Claims. (Cl. 23—66)

This invention relates to a process for the preparation of alkaline earth metal carbonate pigments such as calcium carbonate and to the novel product produced thereby.

Among the conventional procedures for the precipitation of calcium carbonate using sources of calcium ions and carbonate ions is the method involving the use of carbon dioxide gas with a lime slurry. This method would appear to be particularly attractive from an economic standpoint since many industries, among them the pulp and paper industry, often have available flue gas and other sources of carbon dioxide as a starting material. Nevertheless, for several important reasons the method has not attained as widespread a usage as might be expected because the carbonation of slurrys according to this method requires the use of rather elaborate and expensive equipment. Among the conventional equipment is often a tower provided with countercurrent means so that the gas containing carbon dioxide passes upward against downflowing slurry. Since the reaction is quite slow the slurry must be continually recycled from bottom to top necessitating additional equipment to effect a batch operation. In spite of this, considerable carbon dioxide is wasted. Further, as much as 10 or 12 hours may be required for completion of the reaction with the result that any and all equipment used in the process must be of considerable size to enable economical operation of the process. Moreover, with such an apparatus or others which have been suggested, the calcium carbonate is obtained in the form of a dilute aqueous slurry which requires considerable filtering and drying in order to obtain a material suitable for pigmentary purposes, thus adding further processing steps and additional equipment to the outlay of capital required.

The present invention then, deals with a novel process for the preparation of alkaline earth metal carbonates such as calcium carbonate by a simple and yet highly effective and efficient process. The carbonate product produced thereby, often possessing one or more unique characteristics, is especially useful for pigmentary purposes, as for example in paper coatings, and in some cases is actually superior to conventional precipitated carbonate pigments.

In summary, such carbonates as have been described may be obtained by the method of this invention which comprises formation of alkaline earth metal carbonates by carbonating a mechanically fluidized bed of an alkaline earth metal hydroxide while in the form of a moist but powdery or pulverant state. Where desired, the alkaline earth metal hydroxide itself can initially be formed in the same operation as that in which carbonation is performed by the use of a controlled amount of water with an alkaline earth metal oxide as the initial reactant. In any case, whether the alkaline earth metal oxide or its hydroxide be initially employed, it is important that the quantity of free water present be sufficient to control, by its volatilization, the temperature throughout the reaction zone so as to prevent agglomeration but nevertheless insufficient to destroy the powdery condition which exists within the mechanically fluidized reaction bed. The process is particularly adapted to be performed in a continuous manner. The product produced is in a moist powdery condition and can for many purposes be used, as such, without further drying.

An object of this invention therefore is to provide a novel and economical method for the preparation of alkaline earth metal carbonate pigments such as calcium carbonate.

A further object of this invention is a simple and effective process for conducting the carbonation of alkaline earth metal hydroxides with a minimum of high cost equipment.

Still another object of this invention is to produce alkaline earth metal carbonates in such a manner that the exothermic reaction involved yields a powdery product that requires little or no drying.

An additional object of this invention is a method for the continuous production of alkaline earth metal carbonates.

Still another object of this invention is a novel alkaline earth metal carbonate pigment, particularly calcium carbonate.

The objects stated and other objects not specifically mentioned but inherent in the invention will be apparent, reference being made to the drawings illustrating an arrangement for effecting the invention wherein:

FIGURE 1 diagrammatically shows the formation of carbonates according to the method of this invention.

FIGURE 2 is a top plan view showing in greater detail the reaction zone.

According to FIGURE 1, lime, such as that prepared by calcining limestone, is fed through line 11 to any suitable apparatus such as a jaw crusher 10 for subdividing the larger lumps or rocks into coarse granular material. The latter is fed through line 12 to another subdividing apparatus such as a pulverizer 20 where the particles are still further reduced in size and, desirably, screened to remove grit and other coarse material. Since the particle size of the resultant alkaline earth metal carbonate is largely dependent upon the particle size of the starting alkaline earth material, it is preferred in some cases, for example in manufacturing paper coating pigments, that the latter be pulverized or otherwise subdivided to a comparatively fine particle size. Where the carbonate is to be used for such pigmentary purposes, the starting material, when the oxide, should be of such size that 100% is capable of passing through a 40 mesh screen. When the oxide is employed, the explosive nature of the hydration reaction results in a lime hydrate of a much finer size. When the hydroxide is employed it should be of such particle size that 100% will pass through a 200 mesh screen. From the pulverizer the now finely divided lime is desirably led via line 14 to a storage means, illustrated simply as a hopper 30 where it is adapted to be continuously fed by conveyor 16 driven by motor M to an apparatus 50 which defines a reaction zone.

Where lime is to be used that has already been slaked, for example the dry commercial product called hydrated lime, it can be supplied directly into the hopper 30 in the pulverized form in which it is customarily purchased.

The lime, either hydrated or not, is led advantageously to one end or extremity of the zone defined by chamber 18. Water, for example through line 55, may be added to it either before or after it enters the zone although preferably afterwards when the material is lime in the oxide form.

The quantity of water introduced is dependent upon whether lime itself or hydrated lime is used and upon the degree of dryness of the material. For this reason it is desirable to employ a suitable metering device to continuously regulate the quantity of water supplied. Lime which has been calcined is usually nearly free of water.

Hydrated lime, although dry in appearance may often contain a considerable quantity of water. With lime itself enough water should be supplied so that the total water content is in the ratio of 2.0 to 5.5 mols per mol of the alkaline earth metal oxide content of the lime (usually $CaO+MgO$). One mol of water is of course required to hydrate each mol of the oxide. The excess water, i.e., 1.0 to 4.5 mols, is necessary to maintain the temperature sufficiently low to prevent overheating and consequent agglomeration or fusing during the exothermic hydration and carbonation stages. Where the alkaline earth metal hydroxide, i.e., hydrated lime, is to be supplied to the reaction zone, it is only necessary to provide for the excess quantity of about 1.0 to 4.5 mols of water in order to control the temperature. In either case, an excess of water in this range generally ensures maintenance of the lime, hydrate and carbonate in a moist powdery condition and at the same time prevents excessively high temperatures. In both cases it is preferred that the excess water content be in the higher portion of the range, namely about 2.5 to 4.0 mols, wherein the carbonation proceeds more quickly and the carbonate product is discharged in the preferred range of 82 to 87% total solids by weight. A lowering of the excess water content much below 1.0 mol per mol of alkaline earth metal hydroxide or below 2.0 mols per mol of alkaline earth metal oxide results in excessively high temperatures which have the previously mentioned detrimental effect since there is insufficient water to be vaporized as steam while absorbing the enormous quantity of exothermic heat generated. An excessive quantity of water destroys the pulverant condition with the result that carbonation cannot be effected readily and uniformly. Although the actual solids content of a mixture of lime or hydrated lime with water in the higher portion of the range would seemingly be low enough to cause the formation of a paste or somewhat liquid mixture, in actual practice using a mechanically fluidized bed it has been found that the moisture is so quickly vaporized that such a condition almost never exists. At most, the mechanically fluidized mixture may appear in a somewhat doughy condition for a brief instant at the place in the bed where the water is added. Even this condition will quickly disappear to form the moist powdery state. While a provision for external cooling means about the reaction zone can to some extent overcome excessive heat when the water content is too low, the result is a less efficient system since no advantage is taken of the inherent temperature regulation means afforded by the volatilization of water under the exothermic reaction conditions. The mixture of water and lime hydrate should be quite alkaline, preferably with a pH of at least 8.5 and usually in excess of 11.0 as measured in a 50% total solids slurry.

As described previously the carbon dioxide containing gas is preferably led to the bottom of the chamber 18 defining the mechanically fluidized bed to ensure adequate contact with the particles of alkali metal hydroxide. A metering device in the feed line 60 between the source and chamber 18 is a convenient means for measuring the quantity of gas supplied.

If the material charged into the reaction zone defined by chamber 18 from conveyor 16 is lime, it is readily converted with the proper quantity of water to the corresponding moist powdery hydroxide as the particles continually move in the direction of the exit port or conveyor 40. The portion of the reaction zone where the majority of hydration occurs has arbitrarily been depicted as zone A. The heat generated by the exothermic hydration reaction raises the temperature within zone A ordinarily to within the range of 125–250° F. or somewhat more depending upon the chemical composition of the lime, the amount of water initially present, and the extent to which the generated heat and steam is confined within the reaction zone, i.e., by pressure. Preferably the temperature is maintained in the range of 125° to 220° F. for the most uniform and efficient reaction. If desired, the material charged into the reaction zone may be partially hydrated, that is, a mixture of lime and hydrated lime. As the alkali metal hydroxide particles progress into zone B they are exposed to carbon dioxide and hence are converted to the corresponding carbonate. The carbonation is also exothermic although the heat is generated more slowly in this reaction than in the hydration reaction. The temperature will ordinarily decline gradually as the exit it approached since the major portion of the hydroxide is carbonated quickly before it reaches the exit.

Where hydrated lime is the material to be initially supplied from conveyor 16, the procedure is essentially the same except that the quantity of water is reduced as previously described and only carbonation is effected within the confines of chamber 18.

The carbonate product emitted at exit 40 is in a moist powdery condition although it may contain as much as 10 to 20% by weight of water. In effect, the carbonate has been precipitated in the solid state. A quantity of gas is also discharged at the exit and is comprised of water, unreacted carbon dioxide and other materials present in the original gas source.

Whether lime or its hydrate is supplied to the reaction zone, sufficient heat is generated to volatilize a substantial portion of the water present. The volatilization provides an extremely effective means for ensuring that overheating is avoided. Excessive temperatures make it difficult to handle and even more important can result in agglomeration or fusion of the particles and consequently disruption of the crystal structure. For this reason satisfactory results are obtained when sufficient water is employed to maintain the temperature throughout the zone below 250° F. and preferably in the range of 125° to 220° F. Temperatures in excess of 212° F. are apparently due to superheating of the steam resulting from slight positive pressures generated within the partially confined chamber. While temperatures somewhat in excess of even 250° F. may be obtained by use of a pressurized chamber, this is not wholly satisfactory from a practical standpoint for a continuous process.

One feature of the invention is the formation of a mechanically fluidized bed wherein the carbonation of the alkaline earth metal hydroxide may be effected or, in the case where lime is the starting material, both hydration and carbonation may be carried out. Such a bed must be of such characteristics as to continually and completely expose each particle of the starting material to an atmosphere and under such conditions that a virtually complete carbonation of each granule can be effected.

FIG. 1 and in particular FIG. 2 therefore illustrate such an arrangement of components wherein the carbonation is carried out in a zone which is a mechanically fluidized bed of pulverant material. Generally, then, the apparatus 50 is comprised of a trough like chamber 18 having closed ends defined by walls 22 and 24. Necessarily, the chamber 18 is provided with a removable cover 26. The cover 26 is provided with a material receiving aperture or funnel 27 which is disposed beneath the screw conveyor 16 and will permit discharged material therefrom to enter the reaction zone or chamber 18.

Disposed within the chamber 18 adjacent its bottom, are a pair of horizontally disposed, and horizontally spaced, parallel shafts 28 and 29. These shafts are illustrated schematically as shaft 28 in FIG. 1 and more in detail in FIG. 2.

The shafts are rotatably journalled in end walls 22 and 24 in suitable bearings as is conventional and are rotated in opposite directions as indicated by the arrows as shown in FIG. 2. The drive means for the shafts is conventional comprising a pair of gears 34 and 33 keyed to each of shafts 28 and 29, these gears being intermeshed and driven from a common prime mover, for example, electric motor M or the like.

Each of the shafts 28 and 29 is provided with a series of blades or paddles 31 and 32 so mounted on each shaft that their angular position, often referred to as "pitch" or lead may be adjusted. In other words the plane of each blade which is perpendicular to the centerline of each shaft may be adjusted about an axis which passes through and is perpendicular to each shaft centerline. As indicated in FIG. 2 some of the blades 31 and 32 are arranged at such a pitch angle that as the shafts 28 and 29 rotate, any material within the chamber will be forced to move from wall 24 toward wall 22 under shear and turbulence. Others of these paddles are set at a reverse pitch, such that they tend to feed material in chamber 18 toward the entrance. As the shafts 28 and 29 are rotated, the pulverant material in the chamber is caused to almost fluidize due to the action of the paddles 31 and 32 in the sense that while the general flow of the whole bed is toward wall 22, there is created therein a series of reverse currents, eddy currents and the like which slow down the flow from one end of chamber 18 to the other. The whole process may be likened to a rock and curve-bound stream wherein the stream flow is basically in one direction although the obstacles and curves create back flows, eddys and swirls which slow the rate of flow while keeping the entire stream in a constant state of agitation. Thus it may be seen that "a mechanically fluidized bed" is an apt description of the sequence of events in chamber 18.

The material which finally works its way toward wall 22 is eventually removed from chamber 18 by a screw conveyor 40 driven by motor M through a variable speed transmission T as is screw conveyor 16.

The particular arrangement and sequence for paddles 31 and 32 may be varied considerably. Therefore it may be said that the blades are set such as to create a general flow from the one end of chamber 18 to the other, yet provide sufficient agitation and retention of the reactive pulverant material within the chamber to effect complete carbonation.

The drives and motors of two screw conveyors 16 and 40 are conventional and may be purchased on the market. It is also believed obvious that variable speed drives are necessary to regulate the rates of feed-in and feed-out to and from chamber 18 to assure that the bed of material is sufficiently deep to secure the desired results. To this end it will be noted that conveyor 40 is located above the bottom of chamber 18 such that a rather deep bed of reactant material is always present in chamber 18.

Also in communication with the apparatus 50 is a source of water, illustrated in FIG. 1 as line 55 and a source of carbon dioxide illustrated by line 60.

The water is supplied to chamber 18 adjacent the supply of alkaline earth metal, while the gas is admitted through a series of spaced parts 61, 62, 63 and 64 into the very bottom of chamber 18 to assure even discharge of the gas into the chamber in the areas of maximum turbulence in the fluidized bed described. It might be added that both water line 55 and gas line 60 should be provided with quantity measuring devices (not shown) of conventional design to measure the amount of water and gas being injected into the reaction zone as and for the reasons which will become subsequently apparent. Further, it is in many cases desirable to position thermometers or other temperature indicating means at various intervals such as X, Y and Z throughout the length of the chamber 18 in order to follow the temperature of the reactions and make necessary adjustments if necessary.

The chemical composition and properties of the alkaline earth metal carbonates produced in accordance with this invention will depend primarily upon the nature of the alkaline earth metal hydroxide. As previously described, the latter can be formed from an original source of lime by a separate conventional slaking technique or, as is preferred, in the form of a mechanically fluidized bed wherein carbonation can subsequently be effected. The lime, and correspondingly its hydrate, can vary considerably in calcium content. Especially preferred limes are those of a so-called "high calcium" content wherein the CaO content is at least 90% by weight and the MgO content is less than 5% by weight since uniform and virtually complete hydration is readily accomplished therewith. It is to be understood, however, that limes containing appreciable quantities of MgO, i.e., up to 45% by weight or more, may also be employed although there is often considerable difficulty in hydrating the magnesium content within a reasonable period of time. This is particularly true when hydration is to be effected on moist pulverant material in the form of a mechanically fluidized bed just prior to carbonation. A high magnesium containing lime is often composed of as much as 35 to 42% MgO where dolomitic limestone is the source while substantially less, i.e., 8 to 15% or more, may be present when magnesian limestone has been employed. Mixtures of limes, such as a combination of high-calcium lime and a dolomitic lime, can be subjected to carbonation in accordance with this invention. Ordinarily at least 52% of the lime hydrate should be $Ca(OH)_2$. Except with abnormally long carbonation periods, it appears that any combined or uncombined $Mg(OH)_2$ present in the hydrated lime results in a product where it is present as the calcium carbonate magnesium hydroxide rather than the related calcium carbonate magnesium basic carbonate. For many pigmentary purposes, the presence of magnesium compounds even in appreciable quantities is no disadvantage.

The carbon dioxide may be obtained from any convenient source such as lime kiln gases or ordinary flue gases from the burning of carbonaceous fuels such as coal. Purification of such gases, for example by scrubbing, to remove impurities is desirable to prevent contamination of the carbonate product. It is preferred for economic reasons that the gas contains appreciable quantities of carbon dioxide, i.e., at least 10% by volume, in order to prevent unduly long reaction periods for complete carbonation. Where desired, conventional means may be employed to concentrate impure sources of carbon dioxide. Even with the use of the more expensive purified carbon dioxide the overall process represents a substantial economical saving in comparison with conventional slurry techniques. The use of purer forms of carbon dioxide also overcomes the necessity for excessive quantities of gas which often can create a considerable amount of dusting of particles above the mechanically fluidized bed. Ordinarily, the carbon dioxide containing gas should be supplied either at atmospheric pressure or with a slight positive pressure in order to direct the flow of gas into and eventually out of the reaction zone. The quantity of carbon dioxide is not particularly critical although there should be at least a slight molar excess over that required for complete carbonation. A significant feature of this invention is that little carbon dioxide is wasted. An excess of 0.25 to 0.50 mol of $CO_2$ over that theoretically required is ordinarily sufficient whereas often twice this amount or more may be necessary for conventional slurry techniques.

The incorporation of traces of moisture with the carbon dioxide, as by bubbling the carbon dioxide gas through water, enhances the reaction rate with the alkaline earth metal hydroxide. Since the fluidized bed is heated readily by virtue of the exothermic reactions involved, there is no particular advantage in heating the carbon dioxide before it enters the fluidized bed.

In addition to the necessary reactants of lime or its hydrate, water and carbon dioxide it is also possible to add a variety of modifying agents where special properties are desired. The inclusion of a small quantity of sulfate ions or the other materials described and claimed in U.S.

Patent 2,242,228 aids in regulating particle size to some extent. The addition of conventional dispersants such as casein, soya protein and the like in general provides better access of the carbon dioxide to the lime hydrate but otherwise fails to significantly improve the product.

It is to be understood that carbonation according to the method of this invention can be effected to virtually any extent desired depending upon the time of exposure, purity of the source of carbon dioxide, means for ensuring contact of carbon dioxide with the alkaline earth metal hydroxide and to a lesser extent the particle size of the latter. For most pigmentation purposes, particularly paper, the free calcium hydroxide content on a dry weight basis should be less than 1% and preferably less than 0.5%.

The carbonate pigments produced in accordance with this invention will, as in the case of conventional slurry precipitated carbonates, vary considerably in characteristics depending upon the exact operating conditions employed as well as the properties of the reactants. As a pigment for paper coatings it is preferred that the carbonate be in the form of a powder, nearly all particles of which are neither so coarse, i.e., in excess of 40 microns, as to prevent formation of smooth surfaces nor so fine and hence colloidal, i.e., below 0.1 micron, as to lack adequate hiding power.

In the preferred mode of operation according to this invention, carbonate pigments which are particularly suitable for paper coatings and the like are produced to contain particles of which less than 15% by weight are above 5 microns and less than 25% by weight, and preferably less than 15%, are below 0.5 micron. The quantity of colloidal particles is usually quite low. As previously mentioned, the particle size will be determined largely by the size of the lime or lime hydroxide starting material and upon the extent of fracturing encountered in the mechanically fluidized bed.

Although the typical particle size of ordinary precipitated calcium carbonate is often about 0.5 micron in width and 2 microns in length, it presents a much larger surface area owing to its unusual shape. Surface areas of 30,000 cm.$^2$ per gram to as high as 500,000 cm.$^2$ per gram in the case of clusters are most common. The preferred carbonate product prepared in accordance with this invention is generally more dense, ordinarily less than about 25,000 cm.$^2$ per gram. Accordingly, it has greater ink holdout in paper coatings than conventionally precipitated calcium carbonate because greater packing of the particles is possible. The increased packing is particularly advantageous in cast coating of paper with aqueous compositions of an adhesive, such as casein, with the pigment since the latter is molded more easily against the casting surface. The reduced surface area of the carbonates provides another important advantage in that the adhesive requirement in paper coating compositions is often less, usually by at least 10%, than the same carbonate pigment prepared by precipitation from a slurry.

The crystal structure of calcium carbonate as prepared according to the preferred mode of this invention is substantially ovoid in shape as compared to the normal hexagonal calcite or the more unstable aragonite which is orthorhombic. The shape is probably due to the fracturing of the normal hexagonal or orthorhombic crystal caused by shearing action during the mechanical fluidization.

The most satisfactory results have been attained when the carbonate product is discharged at about 80 to 90% total solids by weight. As the quantity of carbonate exceeds much beyond 90% or falls below 80% it is accompanied by a corresponding increase in free lime content owing to the lack of complete reaction of carbon dioxide with the alkali metal hydroxide. Especially preferred is a product discharged at 82 to 87% total solids by weight as the quantity of free lime hydroxide thereof is at a minimum, usually below 1% by weight. An entirely suitable manner for ensuring a proper quantity of water during the reactions is to adjust the quantity of water added so that the product has a solids content in the range of 80 to 90% and preferably 82 to 87%; that is, if the total solids content is too low, less water is added and vice versa.

The following examples will serve to further illustrate the invention. All parts therein as well as throughout the entire specification are by weight unless otherwise stated.

*Example 1*

Employing the apparatus described in FIGURES 1 and 2, there was continuously charged into the reaction chamber 20.0 pounds per hour of high calcium pulverized lime containing 94% CaO and having a particle size of less than 0.020 inch while simultaneously introducing 27.7 pounds per hour of water. This amounted to a ratio of about 4.6 mols of water per mol of CaO. The reaction chamber was approximately 36 inches in length, had a width of 9 inches and a height of 9 inches. The height of the bed of pulverant material averaged about 6 to 7 inches. Pure carbon dioxide gas, heated to a temperature of 205° F. and moistened with a negligible quantity of water by bubbling through a water bath was introduced to the reaction zone as shown in FIGURE 1 through the four inlets. The quantity of $CO_2$ charged into the zone was 24 pounds per hour or about 1.6 mols per mol of CaO.

The rotating shafts driven at 90 r.p.m., had mounted thereon a series of intermeshing paddles as described in FIG. 2. The average temperatures within the reaction zone at locations X, Y and Z of the bed were approximately 207° F., 203° F. and 201° F. respectively. The operation was continued for three hours with only minor variations in temperature and other conditions.

A calcium carbonate produce having a pH of 12.0 (when measured in a 50% slurry) was continuously emitted from the reaction zone at the rate of about 35 pounds per hour. The average total solids content thereof was 84.8% by weight with the average free lime content 1.0% (dry weight). The average specific surface of the calcium carbonate was 16,260 cm.$^2$ per gram as determined using a 1.20 gram sample with a Blaine Air-Permeability Freeness Tester, manufactured by the Precision Scientific Company.

An indication of the particle size of the pigment and more particularly an indication of the usefulness of the carbonate as a suitable paper coating pigment is exemplified by the following procedure:

A mixture of 100 parts pigment and 10 parts casein is made up to 40% total solids content with water followed by ball milling for 2¼ hours. The resultant product is diluted to 10% solids. By pipette, 20 cc. of this solution is measured out and placed in a centrifuge tube which contains 80 cc. of a sugar solution (273 grams of sugar to 1 liter of water). One centrifuge sample is run for each of the 5 microns, 2 microns and 0.5 micron fractions of the coating sample.

| Fraction | Time | R.P.M. |
| --- | --- | --- |
| 5 microns | 37 min. 55 sec | 180 |
| 2 microns | 10 min. 8 sec | 850 |
| 0.5 micron | 42 min. 30 sec | 1,575 |

When the centrifuging has been completed, the liquid is poured off and drained, the remains being placed in weighed crucibles (using distilled water to rinse tubes) and dried in an oven overnight. There is also run two 20 cc. blanks of each coating wherein 20 cc. of 10% solution is pipetted into a weighed crucible and dried overnight.

The dry samples are placed in a cool muffle furnace and brought up to 1750° F. and burned for two hours followed by cooling in desiccator and weighing.

The average weight of the two blanks is divided into the weight of each centrifuge sample to obtain the percent of that size particle in the coating sample.

Particle size distribution was as follows:

| | Percent |
|---|---|
| Above 40 microns (approximate microscopically) | 0 |
| Above 5 microns | 9.35 |
| Above 2 microns | 28.0 |
| Above 0.5 micron | 92.13 |
| Below 0.5 micron (by difference) | 7.87 |

The calcium carbonate was tested as a paper coating pigment by the following procedure:

To a preliminary coated cellulosic paper web having a weight of 48 pounds per ream of 3300 sq. ft. was applied 9 pounds per ream dry of a coating composition of:

100 parts of the prepared $CaCO_3$ (dry weight)
13 parts casein
4 parts of a 50% aqueous emulsion of a polymer of 60% styrene and 40% butadiene and the mixture made up with water to a total solids content of 64%.

Properties of the coated sheet were as follows:

| | |
|---|---|
| Opacity (as measured by a Bausch & Lomb Opacimeter) | 94 |
| Gloss (as measured on a Bausch & Lomb Glossmeter) | 46 |
| Brightness (as measured on a General Electric Brightness Meter) | 84 |
| Print quality | Good |

It is apparent that the product was highly suitable as a paper coating pigment.

In order to further reduce the free $Ca(OH)_2$ content of the above prepared carbonate, as would be desired for some pigmentary purposes, it was resupplied to the same reaction zone at the rate of 26.4 pounds per hour (approximately 85% total solids) while introducing 3.9 pounds per hour of water and 24 pounds per hour of carbon dioxide (temperature of 205° F.) in the manner described with the first treatment above. The lime content of the resultant product was reduced to 0.19% (dry weight) and the product was entirely suitable as a paper coating pigment when tested as above.

Example II

Employing the apparatus described in Example I there was continuously supplied to the reaction zone for carbonation 26.4 pounds per hour of hydrated lime, above 98% $Ca(OH)_2$, 14.5 pounds per hour of water and 24 pounds per hour of pure $CO_2$ gas (temperature 123° F.). This amounted to a ratio of about 2.2 mols of water and 1.5 mols of $CO_2$ per mol of $Ca(OH)_2$. The process was continued for 3 hours. Average properties of the resultant calcium carbonate product were as follows:

Particle size distribution (tested by the procedure of Example I):

| | | |
|---|---|---|
| Above 40 microns | percent | 0 |
| Above 5 microns | do | 8.9 |
| Above 2 microns | do | 36.7 |
| Above 0.5 micron | do | 92.6 |
| Below 0.5 micron | do | 7.4 |
| Percent total solids | | 84.7 |
| Percent free $Ca(OH)_2$ (dry weight) | | 0.62 |
| Specific surface, cm.² per gram | | 13,090 |
| pH | | 13.0 |

Average temperatures in the reaction chamber at points X, Y and Z were 196° F., 180° F. and 181° F., respectively.

Example III

The procedure of Example II is repeated except that the flow of carbon dioxide is reduced to 20 pounds per hour so that the ratio of mols of $CO_2$:mols of $Ca(OH)_2$ is now about 1.3:1. The product is discharged at an average total solids of 85.5%.

During the course of the carbonation samples are taken at various intervals throughout the length of the bed and compared as follows:

| | Percent Free $Ca(OH)_2$ (dry weight) | Specific Surface cm.²/gm. |
|---|---|---|
| (a) | 10.86 | 13,600 |
| (b) | 4.40 | 11,900 |
| (c) | 1.04 | 11,700 |
| (d) | 0.33 | 11,480 |
| (e) | 0.18 | 10,900 |

It is apparent from these figures that the extent of carbonation is a direct function of the length of exposure to carbon dioxide or in this case the dwell time in the chamber. From the values given for specific surface it is considered that although the shearing action has the effect of reduction of particle size, the crystal growth due to carbonation overrides this effect.

Average temperatures in the reaction chamber at points X, Y and Z were 197° F., 198° F. and 191° F., respectively.

Having described the invention in detail it is obvious that some modifications, all within the spirit and scope of the invention, will occur to those skilled in the art. Accordingly, the invention is limited only as defined hereinafter, wherein what is claimed is:

1. The method for producing calcium carbonate which comprises intimately commingling carbon dioxide with a previously mixed alkaline mixture containing a finely divided calcium hydroxide and water in the ratio of 1 mol of calcium hydroxide and between about 1 to 4.5 mols of water while simultaneously mechanically fluidizing said mixture until the free calcium hydroxide content of the product so produced is reduced to below about 1% by weight of said product.

2. The method of claim 1 wherein the process is performed continuously.

3. The method for the continuous production of carbonate pigments which comprises inutroducing finely diveded lime in an essentially anhydrous state into a reaction zone, simultaneously charging water into said zone to provide 2 to 5.5 mols of water per mol of the alkaline earth metal oxide content of said lime and mechanically fluidizing the mixture of water and said lime to thereby hydrate said lime, and further subjecting the resultant hydrated lime to the action of carbon dioxide while maintaining a temperature in the range of 125° F. to 250° F. and continuing the mechanical fluidizing thereof to produce a carbonate pigment having a moisture content within the range of 10 to 20% by weight.

4. The method of claim 3 wherein carbonation is performed until the hydrated lime content of said carbonate pigment is less than 1%.

5. Method for the continuous production of a powdery and nearly dry carbonate pigment from lime without the need for external means for separating water which comprises forming a moist powdery mixture of finely divided lime particles and water in the ratio of about 2 to 5.5 mols of water per mol of alkaline earth metal oxide content of said lime near one extremity of an elongated and partially confined reaction zone, mechanically fluidizing the said mixture to convert the lime particles to moist particles of the corresponding hydroxide while directing the flow along and within the said zone, continuing said mechanical fluidizing and said directional flow upon the said hydroxide particles while subjecting same to the action of carbon dioxide to convert the major portion of said hydroxide to the corresponding carbonate, and further subjecting the mixture of said hydroxide and carbonate to additional mechanical fluidizing and carbon dioxide until the free hydroxide content is less than about 1% by weight.

6. The method of claim 5 wherein the lime is of a high calcium content.

7. The method of claim 5 wherein the lime is dolomitic lime.

8. The method of claim 5 wherein a small quantity of sulfate ions are present in the mixture of lime and water.

9. The method of claim 5 wherein the mixture of lime and water is in the ratio of 3.5 to 5.0 mols of water per mol of lime.

10. The method of claim 5 wherein the temperature maintained during the mechanical fluidizing stages is in excess of 125° F.

11. The method of claim 10 wherein the temperature is in the range of 125° to 220° F.

12. Method for the continuous production of a powdery and nearly dry carbonate pigment from lime without the need for external means for removing water which comprises forming a moist powdery mixture of finely divided lime particles and water in the ratio of about 2.0 to 5.5 mols of water per mol of alkaline earth metal oxide content of said lime near one extremity of an elongated and partially confined reaction zone, mechanically fluidizing the said mixture to convert the lime particles to moist particles of the corresponding hydroxide while directing the flow along and within the said zone, continuing said mechanical fluidizing and said directional flow upon the said hydroxide particles while subjecting same to the action of carbon dioxide until at least about 99% by weight of said hydroxide has been converted to the corresponding carbonate, and recovering said carbonate near the other extremity of the reaction zone.

13. Method for the continuous carbonation of alkaline earth metal hydroxides, the majority of which being $Ca(OH)_2$, which comprises mechanically fluidizing a moist powdery bed of said hydroxide containing 1.0 to 4.5 mols of water per mol of hydroxide within an elongated and partially confined reaction zone, directing the flow of said hydroxide along said bed while simultaneously subjecting the particles thereof to the action of carbon dioxide gas to convert the major portion of said hydroxide to the corresponding carbonate, and further subjecting the mixture of said hydroxide and carbonate to additional mechanical fluidizing and carbon dioxide until the free hydroxide content is less than about 1% by weight and recovering the resultant carbonate product.

14. The method of claim 13 wherein the mechanical fluidizing is performed with shear and turbulence.

15. The method of claim 13 wherein the said hydroxide particles are subjected to carbon dioxide and mechanical fluidizing entirely within the said zone.

References Cited in the file of this patent

UNITED STATES PATENTS

| | | |
|---|---|---|
| 2,062,255 | Brooks et al. | Nov. 24, 1936 |
| 2,565,930 | Rafton | Aug. 28, 1951 |
| 2,802,719 | Avedikian | Aug. 13, 1957 |

FOREIGN PATENTS

| | | |
|---|---|---|
| 164,625 | Great Britain | June 16, 1921 |

OTHER REFERENCES

Miller: "A Study of the Reaction Between Calcium Oxide and Water"; National Gypsum Co., 1961, pages 4–5.

Mellor: "A Comprehensive Treatise on Inorganic and Theoretical Chemistry," vol. 3 (1923), page 817.